(12) United States Patent
Bensch et al.

(10) Patent No.: US 8,833,868 B2
(45) Date of Patent: Sep. 16, 2014

(54) BRAKE SYSTEM FOR A VEHICLE

(75) Inventors: Uwe Bensch, Hannover (DE);
Bernd-Joachim Kiel, Wunstorf (DE);
Wilfried Menze, Springe (DE);
Hartmut Rosendahl, Hannover (DE)

(73) Assignee: WABCO GmbH, Hannover (DE)

( * ) Notice: Subject to any disclaimer, the term of this patent is extended or adjusted under 35 U.S.C. 154(b) by 665 days.

(21) Appl. No.: 12/736,151

(22) PCT Filed: Dec. 19, 2008

(86) PCT No.: PCT/EP2008/010891
§ 371 (c)(1),
(2), (4) Date: Nov. 18, 2010

(87) PCT Pub. No.: WO2009/115111
PCT Pub. Date: Sep. 24, 2009

(65) Prior Publication Data
US 2011/0062774 A1    Mar. 17, 2011

(30) Foreign Application Priority Data

Mar. 15, 2008  (DE) .................. 10 2008 014 547

(51) Int. Cl.
*B60T 8/32*       (2006.01)
*B60T 13/38*     (2006.01)
*B60T 13/68*     (2006.01)

(52) U.S. Cl.
CPC .............. *B60T 13/385* (2013.01); *B60T 13/683* (2013.01)
USPC ......... 303/115.2; 303/15; 303/20; 303/113.1; 188/106 F; 188/140 R

(58) Field of Classification Search
CPC ...... B62D 11/08; B64C 25/48; B60T 13/686; B60T 13/665; B60T 13/74; B60T 13/741; B60T 17/16; B60T 17/18; B60T 8/261; B60T 8/885; B60T 7/12; B61K 7/08; B60R 25/08; F16D 2121/06; F16D 2121/02
USPC ................ 303/15, 17, 20, 115.2, 127, 1, 124, 303/9.61; 188/3 H; 180/271; 701/70, 78
See application file for complete search history.

(56) References Cited

U.S. PATENT DOCUMENTS

| | | | |
|---|---|---|---|
| 5,466,053 A * | 11/1995 | Koelzer | 303/7 |
| 2002/0175561 A1 * | 11/2002 | Jensen | 303/113.1 |
| 2002/0189882 A1 * | 12/2002 | Eberling et al. | 180/281 |

(Continued)

FOREIGN PATENT DOCUMENTS

| | | |
|---|---|---|
| DE | 43 27 759 A1 | 3/1995 |
| DE | 103 36 611 A1 | 3/2005 |
| DE | 201 22 549 U1 | 6/2006 |

*Primary Examiner* — Anna Momper
*Assistant Examiner* — San Aung
(74) *Attorney, Agent, or Firm* — Kramer Levin Naftalis & Frankel LLP

(57) ABSTRACT

A pneumatically-operated vehicle brake system has a first compressed air line in which compressed air at a controllable service brake pressure can be provided. Membrane parts of brake cylinders can be ventilated by the service brake pressure for a service brake function. A parking brake device includes a second compressed air line in which compressed air can be provided at a parking brake pressure electro-pneumatically. Brake cylinder spring brake parts can be ventilated by compressed air at the service brake pressure to provide a parking brake function. The parking brake device also has a ventilation inlet by which the second compressed air line can be ventilated to increase the parking brake pressure, and a first ventilation outlet by which the second compressed air line can be ventilated to reduce the parking brake pressure. The second compressed air line can be pneumatically connected to the first via the first ventilation outlet.

12 Claims, 2 Drawing Sheets

(56) References Cited

U.S. PATENT DOCUMENTS

| | | |
|---|---|---|
| 2005/0029859 A1 | 2/2005 | Bensch et al. |
| 2007/0170774 A1 * | 7/2007 | Gerum et al. .................. 303/20 |
| 2008/0030068 A1 * | 2/2008 | Bensch et al. ................. 303/17 |
| 2010/0252378 A1 * | 10/2010 | Hilberer ..................... 188/106 F |

* cited by examiner under consid-...

BRAKE SYSTEM FOR A VEHICLE

FIELD OF THE INVENTION

The invention generally relates to improvements in a pneumatically operated brake system for a vehicle.

BACKGROUND OF THE INVENTION

Vehicle brake systems of the general type under consideration are known from DE 103 36 611 A1, for example. A brake system of this kind has a service brake function and a parking brake function. By means of the service brake function, diaphragm parts of brake cylinders can be supplied with compressed air at a controllable service brake pressure. By means of the parking brake function, spring brake parts of brake cylinders, in particular of combined spring brake/diaphragm brake cylinders including the diaphragm parts, can be supplied with compressed air at an electro-pneumatically controllable parking brake pressure.

Known brake systems also have an overload protection function for the brake cylinders. This will be explained in greater detail with reference to FIG. 1, which shows the prior art.

FIG. 1 shows parts of a brake system 2, which has a first compressed air line 4, in which compressed air at a controllable service brake pressure can be provided. By means of the service brake pressure, a diaphragm part 6 of a brake cylinder 8, which is designed as a combined spring brake/diaphragm brake cylinder, can be supplied with air to apply a brake in order to brake a vehicle having the brake system 2. Discharging air from the diaphragm part 6 releases the brake again.

The brake system 2 also has a parking brake device 10 having a second compressed air line 12. By means of the parking brake device 10, in particular by means of solenoid valves 14 and 16 situated therein, it is possible for a parking brake pressure to be controlled electro-pneumatically and for compressed air at this parking brake pressure to be provided to the second compressed air line 12. For this purpose, the parking brake device 10 has an air supply inlet 18, via which the second compressed air line 12 can be supplied with compressed air in order to increase the parking brake pressure, and also has an air discharge outlet 20, via which air can be discharged from the second compressed air line 12 in order to reduce the parking brake pressure.

In addition to the diaphragm part 6, the brake cylinder 8 has a spring brake part 22. The spring brake part 22 can be supplied with air at the controlled parking brake pressure present in the second compressed air line 12. During this process, compressed air at parking brake pressure passes via a compressed air line 24, an overload protection valve 26 and a compressed air line 28 into the spring brake part 22. The overload protection valve 26 is designed as a shuttle valve or select-high valve with two compressed air inlets and a compressed air outlet. The shuttle valve 26 pneumatically connects the inlet at which the higher of two pneumatic pressures applied to these inlets is present to the outlet.

By means of a spring in the spring brake part 22 of the brake cylinder 8, it is possible to provide a spring force by means of which a brake can be actuated by the brake cylinder 8. In the case where air is discharged from the spring brake part 22, the brake is actuated by means of the parking brake function. Actuation of the brake by means of the spring is particularly suitable for parking the vehicle since the brake thus remains engaged by means of the brake cylinder 8 by virtue of the spring force alone, even if there is a pressure loss in a compressed air line. While the vehicle is being driven, the spring brake part 22 is supplied with air at at least the parking brake pressure. In this case, the parking brake pressure counteracts the spring force, with the result that, above a minimum parking brake pressure determined by the characteristics of the spring, the brake is no longer actuated by means of the parking brake function.

Simultaneous actuation of the brake cylinder by means of the service brake function and by means of the parking brake function could mechanically overload the brake cylinder and/or the brake. The brake cylinder and/or the brake could suffer a fault and fail. Such an overload on the brake through addition of the forces that are provided by means of the spring brake part 22 and by means of the diaphragm part 6 and that actuate the brake cylinder 8 are counteracted by holding an air pressure in the spring brake part 22 continuously at a level at least equal to an air pressure in the diaphragm part 6, i.e., to the service brake pressure. As long as the brake cylinder 8 actuates the brake by means of the spring in the spring brake part 22, an increase in the air pressure in the diaphragm part 6 leads to a reduction in the force provided by the brake cylinder 8 by means of the spring brake part 22. This reduction is achieved through an increase in the air pressure in the spring brake part 22 to the increased service brake pressure.

According to the prior art, an overload protection function of this kind for the brake cylinder 8 and/or for the brake is achieved by means of the overload protection valve 26. More specifically, the overload protection valve 26 selects the higher of the parking brake pressure and the service brake pressure and supplies air at the higher pressure to the spring brake part 22 of the brake cylinder 8 via a compressed air line 28.

The prior art thus provides a valve, namely the overload protection valve 26, which is used solely for the overload protection function. The overload protection valve 26 increases the cost of producing the brake system. Moreover, the overload protection valve 26 requires a certain amount of assembly work, and therefore the overload protection function for the brake and/or brake cylinder 8 of the prior art brake system 2 leads to higher costs compared with a brake system without an overload protection function. In addition, the overload protection valve 26 takes up valuable space in the vehicle, especially on the vehicle frame.

SUMMARY OF THE INVENTION

Generally speaking, it is therefore an object of the present invention to reduce the space requirement and the assembly work and to lower costs.

This object is achievable by enabling the second compressed air line to be connected to the first compressed air line via the first air discharge outlet. In this context, a pneumatic connection between two compressed air lines means that the pressure in these two compressed air lines is substantially the same or that, when there is a change in the air pressure in one of these two lines, a substantially equal air pressure is established in these two compressed air lines within a short time, in particular in significantly less than one second.

Thus, the pneumatic connection provides an overload protection function and renders the prior art overload protection valve superfluous. In the brake system according to embodiments of the invention, it is still possible, by means of the parking brake function, to discharge air from the spring brake part in order to actuate the brake, even though air discharge from the second compressed air line to the surrounding atmosphere is dispensed with in the parking brake device.

It is advantageous if air can be discharged from the second compressed air line via the first air discharge outlet, the first compressed air line and a second air discharge outlet of a brake pedal device. Only relatively small quantities of air are moved in the second compressed air line as compared with the compressed air required to supply air to the spring brake part of the brake cylinder. Discharging air from the compressed air line to atmosphere via a second air discharge outlet at the brake pedal device is therefore unproblematic. It is therefore unnecessary to discharge air from the second compressed air line to atmosphere in the region of the parking brake device.

As an alternative or in addition, a braking request signal can be produced by means of the brake pedal device in response to an actuation of a brake pedal of the brake pedal device. In response to the braking request signal, the service brake pressure can be controlled electro-pneumatically and provided in the first compressed air line.

In this context, the air pressure is preferably controlled electro-pneumatically in a brake control device. In particular, the brake control device can be a rear axle brake control module, which is preferably installed in the region of the rear axle of the vehicle.

The brake control device preferably has a third air discharge outlet, via which air can be discharged from the second compressed air line via the first air discharge outlet and the first compressed air line.

It is advantageous if the parking brake device has at least one of the following components: a first solenoid valve, in particular a bistable valve for controlling the parking brake pressure, a second solenoid valve for switching between a pneumatic connection and shut-off between the second compressed air line and the air supply inlet or the first air discharge outlet, a relay valve for increasing the quantity of air for the parking brake pressure, and a third solenoid valve for selectively supplying compressed air to a fourth compressed air line, which is either at the reservoir air pressure, in a first control state of the solenoid valve, or at the controlled parking brake pressure, in a second control state of the solenoid valve. By means of the fourth compressed air line, it is thus possible, in the first control state, to supply a trailer control valve with compressed air at the reservoir air pressure so as to provide a trailer monitoring function.

Still other objects and advantages of the present invention will in part be obvious and will in part be apparent from the specification.

The present invention accordingly comprises the features of construction, combination of elements, and arrangement of parts, all as exemplified in the constructions herein set forth, and the scope of the invention will be indicated in the claims.

BRIEF DESCRIPTION OF THE DRAWINGS

Exemplary embodiments of the invention will be explained in greater detail below with reference to the attached drawings, in which.

DETAILED DESCRIPTION OF THE PREFERRED EMBODIMENTS

Figure 1:
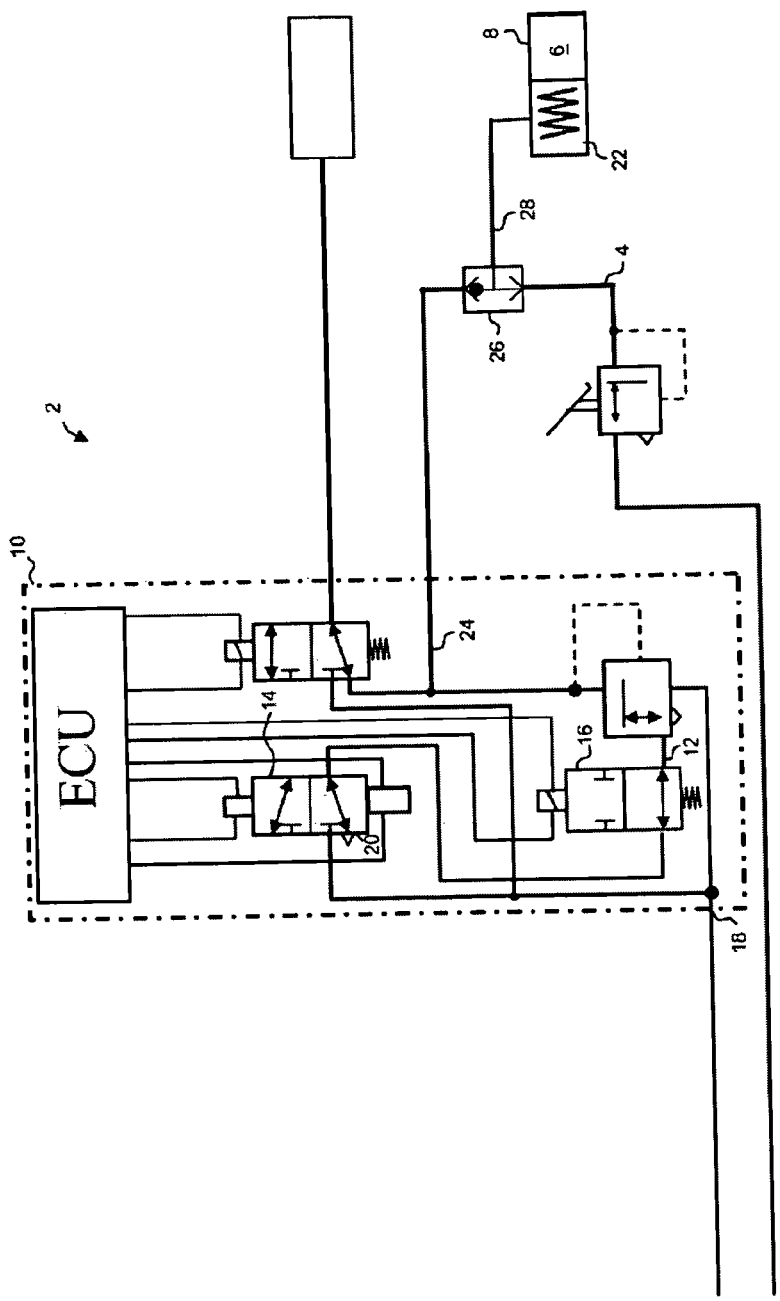
FIG. 1 is a simplified schematic representation of a prior art brake system having an overload protection function for a brake.

FIG. 1 has already been described above with those of its features that are essential to explain the prior art.

Figure 2:
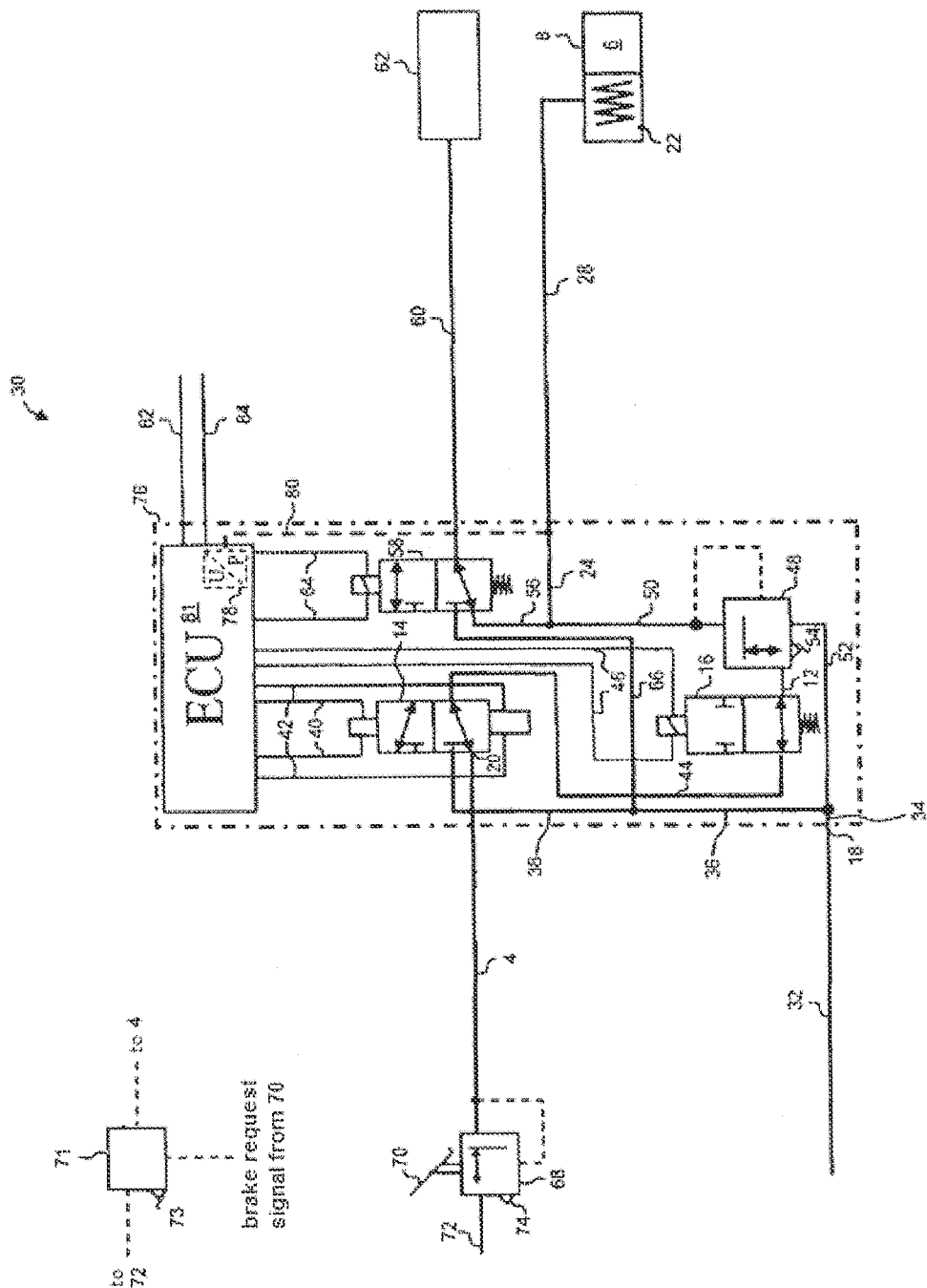
FIG. 2 is a simplified schematic representation of a brake system according to an embodiment of the invention having an overload protection function for a brake.

FIG. 2 shows a brake system 30 according to an embodiment of the invention, which is equivalent in parts to the prior art brake system 2 shown in FIG. 1. To this extent, the same reference signs denote the same components, and attention is drawn to the corresponding discussion above.

In the brake system 30, compressed air at a reservoir air pressure passes from a compressed air reservoir (not shown), via a compressed air line 32, to the air supply inlet 18. Compressed air lines 34, 36 and 38 carry this compressed air to a first solenoid valve 14, which is embodied as a bistable valve. The bistable valve 14 can be switched into two control states. For this purpose, solenoids are activated via electrical leads 40 and 42 to switch between these states. Even if there is a power outage, the bistable valve 14 remains in its instantaneous control state, thus preventing unwanted application or release of brakes in the case of a power outage and contributing to the safety of the brake system. As an alternative, the bistable valve 14 can be fitted with just one coil and can change into the other stable state through reversal of the polarity of the voltage pulse in lead 40. In this alternative embodiment, lead 42 would be eliminated.

In a first control state, the bistable valve 14 connects compressed air line 38 pneumatically to a compressed air line 44. When solenoid valve 16 is de-energized, the compressed air line 44 and, hence, also the compressed air inlet 18 is furthermore connected pneumatically to the second compressed air line 12.

In a second control state of the bistable valve 14, on the other hand, air can be discharged from the second compressed air line 12 to the first compressed air line 4 via solenoid valve 16, compressed air line 44, bistable valve 14 and the first air discharge outlet 20. In the first control state of the bistable valve 14, the parking brake pressure in compressed air line 12 can thus be increased up to a maximum of the reservoir air pressure, and, in the second control state of the bistable valve 14, it can be reduced to a minimum of the pneumatic pressure in the first compressed air line 4.

The air pressure, which can thus be controlled and provided in compressed air line 44, can be held by means of the second solenoid valve 16. Specifically, in a second, energized, control state of the second solenoid valve 16, the second compressed air line 12 can be shut off from compressed air line 44 and, hence, both from the compressed air inlet 18 and from the first compressed air outlet 20. For the purpose of switching, the second solenoid valve 16 can be electrically activated by means of electrical leads 46. A controlled parking brake pressure can thus be held in the second compressed air line 12 in the energized control state of the second solenoid valve 16 without the need for continuous switching between the two control states of the bistable valve 14. In a first, de-energized, control state of the second solenoid valve 16, on the other hand, the compressed air line 44 is connected pneumatically to the second compressed air line 12. Neither of the solenoid valves 14 and 16 thus has to be energized, either in the driving mode or in the parked condition of the vehicle, i.e., either when the second compressed air line 12 is supplied with air at the reservoir air pressure or when air is discharged from it or supplied to it at the service brake pressure. Energy-saving operation of the brake system 30 is thus possible.

Compressed air at the parking brake pressure is provided in a third compressed air line 50 by means of a relay valve 48. In this case, compressed air can be provided in a larger quantity, by means of the relay valve 48, than via the second compressed air line 12. Specifically, the third compressed air line 50 can be supplied with air by means of the relay valve 48 via the air supply inlet 18, compressed air line 34 and a compressed air line 52. Air discharge from compressed air line 50 when the controlled parking brake pressure in the second compressed air line 12 falls is possible via a fourth air discharge outlet 54 at the relay valve 48. Owing to the possibility of discharging air from the third compressed air line 50 via the fourth air discharge outlet 54, the relay valve 48 makes it possible to keep the quantities of air to be discharged via the first air discharge outlet 20 relatively small, and the quantities can therefore be discharged in a particularly advantageous manner via the first compressed air line and an air discharge of the first compressed air line 4 already present for the purpose of reducing the service brake pressure.

The quantitatively supplemented compressed air in the third compressed air line 50 is provided to a trailer control valve 62 via a compressed air line 56, a third solenoid valve 58 and a fourth compressed air line 60. By means of the trailer control valve 62, the parking brake pressure can be inverted. Compressed air at the inverted parking brake pressure can be provided to a trailer for the purpose of supplying air to diaphragm parts of brake cylinders in order to brake the trailer. In the case where the fourth compressed air line 60 is supplied with air at a predetermined minimum air pressure, air is thus discharged from the diaphragm parts of the brake cylinders on the trailer unless the diaphragm parts are being supplied with air by means of the service brake function. In the case where air is discharged from compressed air line 60, by contrast, the diaphragm parts of the brake cylinders on the trailer are supplied with air by means of the parking brake function, by means of the trailer control valve 62. In the de-energized condition of the third solenoid valve 58, the third compressed air line 50 and the fourth compressed air line 60 are connected pneumatically to one another.

The third solenoid valve 58 can be activated via electrical leads 64 and switched to a second control state by energization of a solenoid. In this second control state, a compressed air reservoir can be connected pneumatically to the fourth compressed air line 60 via compressed air line 32, the air supply inlet 18, compressed air lines 34 and 36, a compressed air line 66 and the third solenoid valve 58. Via the third solenoid valve 58, the fourth compressed air line 60 and, hence, the trailer control valve 62, can be supplied with air at a reservoir air pressure in the second control state of the third solenoid valve 58. In the case where the fourth compressed air line 60 is supplied with air and air is simultaneously being discharged from the second compressed air line 12 and third compressed air line 50, the parking brake function acts only on brake cylinder 8 and not on brake cylinders of a trailer, which are activated pneumatically by means of the trailer control valve 62.

For the service brake function, the service brake pressure in the first compressed air line 4 can be controlled by means of a brake pedal device 68. For this purpose, the brake pedal device 68 has a brake pedal 70, which can be primarily foot operated. Moreover, the brake pedal device 68 is connected via a compressed air line 72 to a compressed air reservoir (not shown), enabling the first compressed air line 4 to be supplied with compressed air from the compressed air reservoir in response to an actuation of the brake pedal 70. Air can be discharged from the first compressed air line 4 via a second air discharge outlet 74 on the brake pedal device 68. Thus, overall, the service brake pressure can be pneumatically controlled and provided to the first compressed air line 4 by means of the brake pedal device 68 in response to an actuation of the brake pedal 70. The diaphragm part 6 of the brake cylinder 8 can be supplied with compressed air which is at service brake pressure via at least one compressed air line. In the case where the diaphragm part 6 of the brake cylinder 8 is supplied with air, the brake is actuated by means of the brake cylinder 8, by means of the service brake function.

The brake pedal device 68 can be connected pneumatically to the second compressed air line 12 via the first compressed air line 4, the first air discharge outlet 20, the bistable valve 14, compressed air line 44 and solenoid valve 16. As long as the second compressed air line 12 is not shut off from compressed air line 44 by means of the energized solenoid valve 16, at least the service brake pressure controlled by means of the brake pedal device 68 is thus always established as the parking brake pressure in the second compressed air line 12. Air discharge from the second compressed air line 12 can be limited such that the controlled parking brake pressure 12 is always at least as high as the controlled service brake pressure in the first compressed air line 4.

The spring brake part 22 of the brake cylinder 8 is connected pneumatically directly to the third compressed air line 50, i.e., without the interposition of an overload protection valve, via compressed air lines 24 and 28. If appropriate, it is also possible for the spring brake part 22 to be capable of being connected to the third compressed air line 50 via compressed air lines 24 and 28 with the interposition of an additional valve (not shown), for example. It is, thus, always the parking brake pressure that is established in the spring brake part 22, which can be controlled by means of the parking brake function in a parking brake device 76 having the solenoid valves and which can be provided in the second compressed air line 12 and in the third compressed air line 50.

For monitoring purposes and for adjusting the parking brake pressure controlled by means of the parking brake device 76, a pressure sensor 78 is provided connected pneumatically to the third compressed air line 50 via a compressed air line 80 and compressed air line 24. The controlled parking brake pressure is, thus, present in compressed air line 80, and this pressure can be sensed as an actual value by means of the pressure sensor 78. This actual value is used by a control device 81, in which the pressure sensor 78 is arranged, for comparison with a predetermined or predeterminable desired value for a parking brake pressure to be set. The control device 81 furthermore electrically activates solenoid valves 14, 16 and 58. The parking brake pressure can therefore easily be adjusted by means of the control device 81, through appropriate activation of solenoid valves 14 and 16, such that the actual value matches the desired value. Actuation of brakes by means of the parking brake function can thus be accomplished in a finely modulated manner.

A number of electrical leads are furthermore connected to the control device 81. A CAN data connection to other devices of the brake system 30 and, if appropriate, of the vehicle, in particular electrical or electronic devices, is provided by two leads 82 and 84.

As a departure from this illustrative embodiment in accordance with FIG. 2, it is also possible for the service brake pressure in the first compressed air line 4 to be controlled electro-pneumatically. In response to an actuation of the brake pedal 70, a braking request signal is in this case produced, in response to which the service brake pressure is controlled by a brake control device 71 by means of at least one solenoid valve contained therein. In this case, a redundant pressure can additionally be controlled pneumatically in response to the actuation of the brake pedal 70.

If the brake control device is functioning properly, the service brake pressure in the first compressed air line 4 can be controlled electro-pneumatically and, otherwise, pneumatically. Air can be discharged from the second compressed air line 12 via the brake control device in both cases, via the brake pedal device 68 in both cases or, where the brake control device is functioning properly, via a third air discharge outlet 73 at the brake control device, or otherwise via the second air discharge outlet 74 of the brake pedal device 68.

As an alternative to the illustrative embodiment shown, it is also possible for the parking brake pressure to be implemented by means of different solenoid valves and/or different pneumatic interconnection of the solenoid valves 14 and 16. The invention is not restricted to the valve arrangement shown in FIG. 2 for controlling the parking brake pressure. In all cases, however, the parking brake pressure can be controlled electro-pneumatically by means of a parking brake device 76, the parking brake device 76 having the air supply inlet 18, via which compressed air can be provided at a reservoir air pressure, it being possible, by means of the parking brake device 76, to provide a controlled parking brake pressure, and the parking brake device 76 having an air discharge outlet 20, it being possible to reduce the parking brake pressure by means of air discharge via the air discharge outlet 20. According to inventive embodiments, the first compressed air line 4, which carries compressed air at the controlled service brake pressure, is pneumatically connected to the first air discharge outlet 20, with the result that air discharge is possible via the first compressed air line 4 as long as the controlled parking brake pressure exceeds the controlled service brake pressure. An overload protection function for the brake cylinder 8 is thereby achieved since a supply of air to the spring brake part 22 at at least the service brake pressure counteracts the force of the spring in the spring brake part 22 while the service brake is actuated. In contrast to the prior art, this is achieved without the overload protection valve that is usually used for the overload protection function. This saves space and assembly work since the number of components is reduced. The invention thus advantageously improves over the known brake systems having an overload protection function.

All the features mentioned in the description of the figures, in the claims and in the introduction to the description can be employed both individually and in any desired combination.

It will be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall therebetween.

What is claimed is:

1. A pneumatically operated vehicle brake system, comprising a first compressed air line having compressed air at a controllable service brake pressure to supply diaphragm parts of brake cylinders with air for a service brake function of the vehicle; and a parking brake device including a second compressed air line having compressed air at an electro-pneumatically controllable parking brake pressure to supply spring brake parts of the brake cylinders with air to provide a parking brake function, the parking brake device further including an air supply inlet supplying the second compressed air line with compressed air to increase the parking brake pressure, and a first air discharge outlet via which air is dischargeable from the second compressed air line to reduce the parking brake pressure, the second compressed air line being pneumatically connectable to the first compressed air line via the first air discharge outlet.

2. The brake system as claimed in claim 1, further comprising a brake pedal device having a brake pedal and a second air discharge outlet, wherein the service brake pressure is pneumatically controllable in response to an actuation of the brake pedal, wherein the service brake pressure is provided in the first compressed air line, and wherein air is dischargeable from the second compressed air line via the first air discharge outlet, the first compressed air line and the second air discharge outlet.

3. The brake system as claimed in claim 1, further comprising a brake pedal device having a brake pedal, wherein, in response to an actuation of the brake pedal, a braking request signal is produced, and wherein, in response to the braking request signal, the service brake pressure is controllable electro-pneumatically and compressed air at the service brake pressure is provided in the first compressed air line.

4. The brake system as claimed in claim 3, further comprising a brake control device, configured to electro-pneumatically control the service brake pressure and to provide compressed air at the service brake pressure in the first compressed air line.

5. The brake system as claimed in claim 4, wherein the brake control device has a third air discharge outlet, and wherein air is dischargeable from the second compressed air line via the first air discharge outlet, the first compressed air line and the third air discharge outlet.

6. The brake system as claimed in claim 1, wherein the parking brake device has a first solenoid valve providing a first control state in which the second compressed air line is supplied with air via the air supply inlet, and a second control state in which the second compressed air line is pneumatically connectable to the first compressed air line via the first air discharge outlet.

7. The brake system as claimed in claim 1, wherein the parking brake device has a second solenoid valve providing a first energized control state in which the second compressed air line is shut off from the air supply inlet and from the first air discharge outlet, and a second de-energized control state in which the second compressed air line is pneumatically connectable to one of the air supply inlet and the first air discharge outlet.

8. The brake system as claimed in claim 1, wherein the parking brake device includes a relay valve configured to effect the supply of a third compressed air line with air via the air supply inlet and to effect the discharge of air from the third compressed air line via a fourth air discharge outlet such that the pressure in the third compressed air line is substantially the parking brake pressure.

9. The brake system as claimed in claim 1, wherein the parking brake device includes a third solenoid valve having at least two control states to provide a trailer monitoring function, wherein, in a first energized control state, a fourth compressed air line for connection to a trailer control valve is supplied with air at a reservoir air pressure via the air supply inlet, and, in a second de-energized control state, the fourth compressed air line is pneumatically connectable to the second and third compressed air lines to supply air at the parking brake pressure.

10. The brake system as claimed in claim 1, wherein said brake cylinders are combined spring brake/diaphragm brake cylinders including diaphragm parts.

11. The brake system as claimed in claim 4, wherein the brake control device is a rear axle brake control module.

12. The brake system as claimed in claim 6, wherein the first solenoid valve is a bistable valve.

* * * * *